(12) United States Patent
Spengler

(10) Patent No.: US 8,387,673 B2
(45) Date of Patent: Mar. 5, 2013

(54) METHOD AND APPARATUS FOR PRODUCING A THREE-DIMENSIONALLY MOLDED, LAMINATED ARTICLE WITH TRANSFER-PRINTED SURFACE DECORATION

(75) Inventor: Gerhard Spengler, Frankfurt am Main (DE)

(73) Assignee: Herbert Olbrich GmbH & Co. KG, Bocholt (DE)

( * ) Notice: Subject to any disclaimer, the term of this patent is extended or adjusted under 35 U.S.C. 154(b) by 368 days.

(21) Appl. No.: 12/897,236

(22) Filed: Oct. 4, 2010

(65) Prior Publication Data

US 2011/0017402 A1    Jan. 27, 2011

Related U.S. Application Data

(62) Division of application No. 12/217,024, filed on Jun. 30, 2008, now Pat. No. 8,012,290.

(51) Int. Cl.
    *B32B 37/00* (2006.01)
(52) U.S. Cl. ...... 156/359; 156/500; 156/542; 156/583.1
(58) Field of Classification Search .................. 156/359, 156/500, 538, 539, 540, 541, 542, 580, 581, 156/583.1
    See application file for complete search history.

(56) References Cited

U.S. PATENT DOCUMENTS

| | | |
|---|---|---|
| 3,444,732 A | 5/1969 | Robbins et al. |
| 4,059,471 A | 11/1977 | Haigh |
| 4,223,057 A | 9/1980 | Rejto |
| 4,587,155 A | 5/1986 | Durand |
| 4,888,082 A | 12/1989 | Fetcenko et al. |
| 5,324,384 A | 6/1994 | Spengler |
| 5,707,472 A | 1/1998 | Smith |
| 5,709,925 A | 1/1998 | Spengler et al. |
| 5,908,524 A | 6/1999 | Masui et al. |
| 6,035,777 A | 3/2000 | King |
| 6,136,415 A | 10/2000 | Spengler |
| 6,214,157 B1 | 4/2001 | Spengler |
| 6,287,678 B1 | 9/2001 | Spengler |
| 6,749,794 B2 | 6/2004 | Spengler |
| 6,814,831 B2 | 11/2004 | Drake |
| 6,964,722 B2 | 11/2005 | Taylor et al. |
| 6,982,021 B2 | 1/2006 | Spengler |
| 7,101,503 B2 | 9/2006 | Spengler et al. |
| 7,204,949 B2 | 4/2007 | Watanabe et al. |
| 7,413,581 B2 * | 8/2008 | Abrams ............................ 8/471 |
| 8,012,290 B2 * | 9/2011 | Spengler ...................... 156/242 |
| 2004/0053001 A1 | 3/2004 | Abrams |
| 2004/0217508 A1 | 11/2004 | Parker et al. |
| 2007/0079928 A1 | 4/2007 | Abrams et al. |
| 2009/0321002 A1 | 12/2009 | Spengler |

OTHER PUBLICATIONS

Brochure "Transfer Printing with Transfertex"; undated; 5 pages; by Transfertex GmbH & Co. Thermodruck KG, Kleinostheim, Germany.

(Continued)

*Primary Examiner* — James Sells
(74) *Attorney, Agent, or Firm* — W. F. Fasse

(57) ABSTRACT

An apparatus includes a heating station, a laminating and transfer-printing station, and a molding station in succession, and a transport arrangement that transports the material being processed among the stations. In the heating station, a substrate is pre-heated and consolidated. In the laminating and transfer-printing station, a decorative cover layer is laminated onto the substrate and simultaneously a surface decoration (design, pattern, image, colors, text, etc.) is transfer-printed by sublimation of inks or dyes from a transfer paper onto an outer surface of the decorative cover layer. The resulting laminated body with a transfer-printed surface decoration is then three-dimensionally deformed and molded to form a three-dimensionally contoured, molded, laminated article with the transfer-printed surface decoration. The article may be a motor vehicle interior trim component.

27 Claims, 3 Drawing Sheets

OTHER PUBLICATIONS

Website pages "Transfer Printing", "Home Textiles", "Printable Fabrics", "Special Applications"; from http://www.tfx.de/FlashVersion/englisch/indexe.html; May 16, 2008 and Nov. 6, 2008; 4 pages.

Article "Dye-Sublimation Printer"; from http://en.wikipedia.org/wiki/Dye-sublimation printer; May 2007 to Oct. 2008; 5 pages.

* cited by examiner

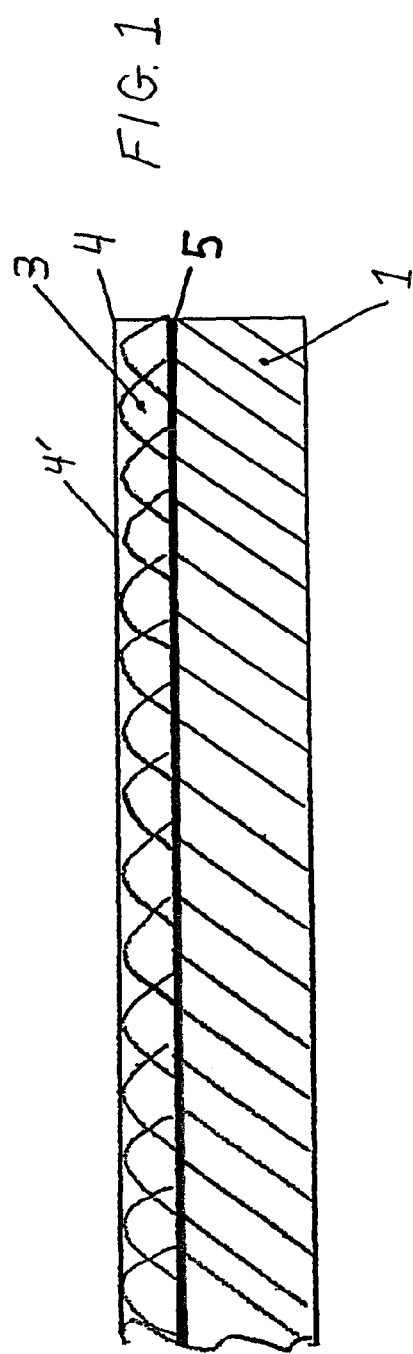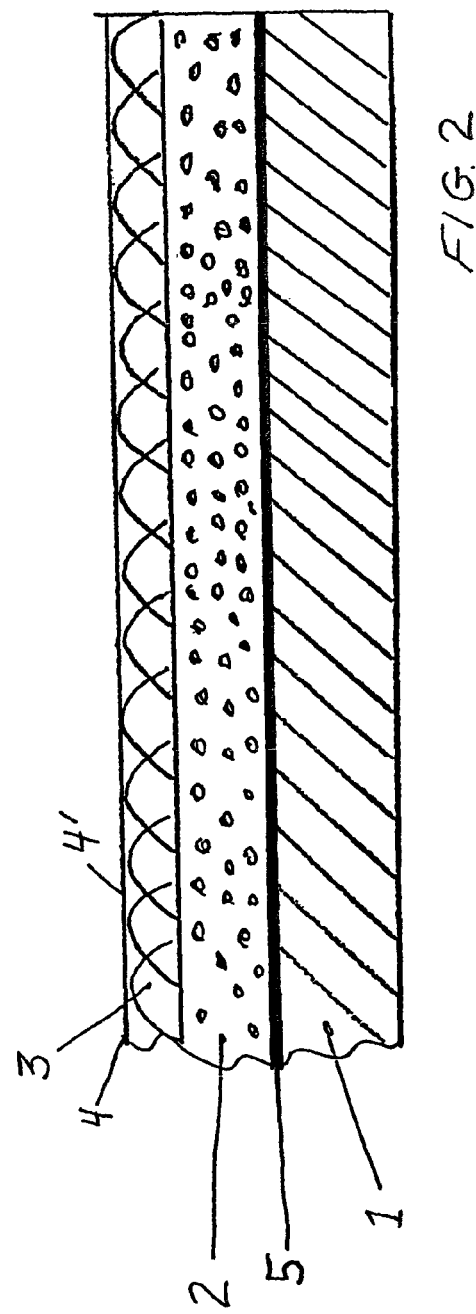

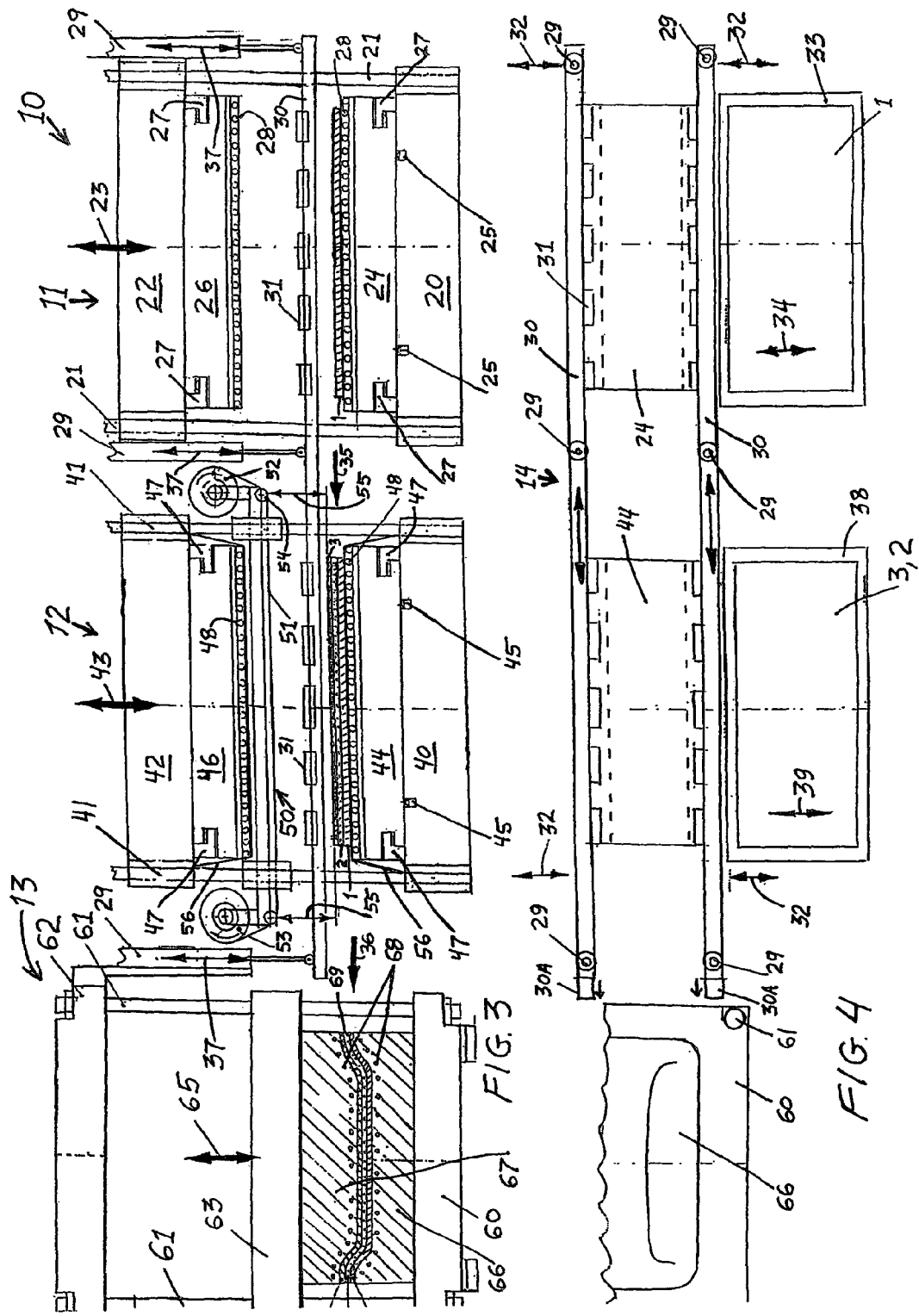

METHOD AND APPARATUS FOR PRODUCING A THREE-DIMENSIONALLY MOLDED, LAMINATED ARTICLE WITH TRANSFER-PRINTED SURFACE DECORATION

CROSS-REFERENCE TO RELATED APPLICATION

This application is a Divisional and claims the benefit under 35 USC 120 and 121 of U.S. application Ser. No. 12/217,024 filed on Jun. 30, 2008, now U.S. Pat. No. 8,012,290, the entire disclosure of which is incorporated herein by reference.

FIELD OF THE INVENTION

The invention relates to an apparatus and a method for producing an article of manufacture, such as an interior trim component for a motor vehicle, that is laminated, three-dimensionally molded, and provided with a decorative surface.

BACKGROUND INFORMATION

Motor vehicle interior trim components, such as automobile headliners, trunk liners, rear package shelves, and A-, B- and C-column cover panels, and such as aircraft cabin paneling, are conventionally produced by laminating and molding several material layers. It is generally known to provide a multi-layered structural substrate of synthetic and/or natural fibers, to laminate a surface cover layer onto the structural substrate, and to three-dimensionally mold the laminated article into a finished three-dimensional configuration. The lamination and molding processes can be carried out in plural steps, or alternatively in one single working operation. The structural substrate is produced from one or several layers of synthetic and/or natural materials, such as synthetic and/or natural fibers in a heating and pressing process that may utilize hot melt adhesion. It is further known to incorporate an elastic foam layer between the substrate and the cover layer to achieve a "soft touch" effect, over the entire surface area of the article, or especially at selected partial areas that are to have enhanced cushioning. U.S. Pat. No. 5,709,925 (Spengler et al.), U.S. Pat. No. 6,287,678 (Spengler), U.S. Pat. No. 6,982,021 (Spengler) and U.S. Pat. No. 7,101,503 (Spengler et al.) disclose examples of laminated molded articles as well as methods and apparatuses for producing such articles according to the prior art as generally discussed above.

In the known three-dimensionally molded laminated articles, such as motor vehicle interior trim components, various different material layers may be used as the cover layer, depending on the desired appearance, quality, and price (among other factors) of the finished article. For example, the cover layer may comprise a layer or sheet of natural leather, synthetic leather, vinyl or other plastic films, or woven or non-woven fabrics. The material for the cover layer is conventionally provided as a finished sheet material in the form of a large sheet, web or roll, from which the required size and shape of the cover layer for the trim component is cut.

Furthermore, in order that the cover layer provides a decorative finished surface of the trim component, the sheet material for the cover layer may have a desired decorative appearance, such as a desired design, pattern or colors, as intended for the finished trim component. For example, when a woven fabric is used as the decorative cover layer, the fabric is provided with the desired pattern or design woven into the fabric with different colored threads or yarns by means of any suitable weaving technology. However, woven fabrics with such woven-in patterns or designs are relatively expensive, and thus lead to a significant cost increase in the production of motor vehicle interior trim components using such patterned woven fabrics as decorative cover layers. Also, because the decorative cover layer material is produced and provided with the particular design or pattern incorporated in the material as supplied, it becomes necessary to stock a variety of different materials in order to be able to provide different colors, designs or patterns for the decorative surface of the trim components being produced. This leads to strict limitations on the number of different colors, designs or patterns that can be offered for the trim components being produced, or leads to high costs due to the need of provisioning and storing an increased number of different cover layer materials with different colors, designs or patterns. This has a direct disadvantage for the manufacturer of the trim components, and for the ultimate consumer, because the individuality in the choice of color, design or pattern, as well as the color coordination with different automobile interior schemes is limited and/or the cost of the automobile is increased.

Some of the conventionally utilized cover layer materials, such as natural leather, have a natural texture or surface graining. Other cover layer materials such as synthetic leather, have a pre-formed surface texture, or graining, for example mimicking the natural grain of real leather. It is also possible to mold or emboss a surface texture or graining into the cover layer material during the lamination and molding process, for example according to U.S. Pat. No. 6,749,794 (Spengler).

In the textile industry, it is known to produce fabrics having patterns or designs woven into the fabric during the weaving production thereof. It has also become known that decorative designs or patterns can be printed onto fabrics after the fabrics have been produced without patterns or designs. Particularly, transfer-printing has been used for printing decorative designs or patterns onto fabrics for clothing and household goods (e.g. curtains, tablecloths, bed linens). This has made it possible to produce a great variety of designs, patterns, and the like rather quickly and economically on a single plain stock fabric as needed. Therefore, it is not necessary to pre-manufacture and store a great number of different fabrics with different woven-in designs or patterns. Instead, the desired design is printed onto a web of transfer paper using special inks or sublimation dyes, for example from an engraved printing cylinder by a rotogravure process. Then, to carry out the transfer-printing, the design is transferred from the transfer paper onto the fabric under the effects of pressure and heat. Particularly, the transfer paper and the fabric are brought into contact with one another and are heated and pressed together as they are guided around a heated cylinder of a calender apparatus. The special ink or sublimation dye on the patterned transfer paper sublimates, i.e. is converted from the solid state into the gaseous state, at a temperature of 195 to 215° C. during a dwell time of 25 to 35 seconds. The sublimated gaseous dye is transferred to the woven textile or non-woven material fabric and diffused into the fibers of the fabric. The printed fabric then has the desired pattern and is ready for use without further treatment.

The entire disclosures of all of the US patents cited above are incorporated herein by reference as a part of the content and disclosure of the present application. The present application builds on, further develops, and improves on the above cited patents.

SUMMARY OF THE INVENTION

In view of the above, it is an object of the present invention to provide an apparatus and a method for producing a laminated and three-dimensionally molded article that has a surface decoration, which can be produced with great variety and individual selection, in a quick and economical manner. It is a further object of the invention to increase the variety of different surface decorations that can be offered for laminated three-dimensionally molded articles such as motor vehicle interior trim components, while eliminating or reducing the need to supply and store a number of different decorative cover layer stock materials. A more particular object of the invention is to combine the transfer-printing technique into an apparatus and a method for producing a laminated and three-dimensionally molded article, so that such an article receives a transfer-printed surface decoration in an economical manner and with great variety. The invention further aims to avoid or overcome the disadvantages of the prior art, and to achieve additional advantages, as apparent from the present specification.

The above objects have been achieved according to the invention, whereby the techniques of heating a structural substrate, laminating a cover layer directly or indirectly onto the substrate, transfer-printing a surface decoration onto the cover layer, and performing three-dimensional molding have been incorporated in a single unified production process and apparatus. Basically, the present invention combines a process and equipment for carrying out the transfer-printing, with laminating and molding methods and equipment disclosed herein and/or with any of the known methods and apparatuses according to the US patents cited above herein, as well as further improvements and developments.

The apparatus and the method according to the invention can produce a three-dimensionally contoured laminated article that includes:
- a structural substrate that comprises natural fibers and synthetic fibers, wherein the synthetic fibers have been at least partly melted so as to hot-melt bond together the natural fibers and the synthetic fibers,
- a cover layer that is laminated directly or indirectly on the structural substrate and that has a visibly exposed outer surface, and
- a surface decoration that is visible on the outer surface and that comprises a sublimatable ink or dye which has been transfer-printed onto the outer surface of the cover layer and which has diffused into the cover layer.

The structural substrate and the cover layer both have a three-dimensionally contoured configuration including a three-dimensionally contoured area on the outer surface, and at least some of the surface decoration is disposed on at least some of the three-dimensionally contoured area.

An aspect of the invention is directed to an apparatus for producing a three-dimensionally contoured laminated article. The inventive apparatus includes a laminating and transfer-printing station and a molding station. The laminating and transfer-printing station includes a first laminating tool, a second laminating tool that is relatively drivable toward and away from the first laminating tool, a laminating heater arrangement that is arranged and adapted to heat the first and second laminating tools, and a transfer-printing transfer medium carrier arrangement that is movably arranged between the first and second laminating tools and that is drivable toward and away from at least one of the laminating tools. The carrier arrangement is arranged and adapted to supply and feed a transfer medium for transfer-printing between the first and second laminating tools. The first and second laminating tools respectively have first and second laminating press surfaces arranged and adapted to receive, heat and press therebetween the transfer medium and a laminated body as an intermediate product for production of the three-dimensionally contoured laminated article, whereby a surface decoration (e.g. design, pattern, image, colors, text, artificial grain appearance, or the like) is transfer-printed from the transfer medium onto a surface of the laminated body. The molding station includes a first mold tool and a second mold tool that is relatively drivable toward and away from the first mold tool. The first and second mold tools respectively have first and second three-dimensionally contoured mold surfaces arranged and adapted to receive and three-dimensionally mold therebetween the laminated body to produce the three-dimensionally contoured laminated article having the surface decoration on an outer surface thereof.

Another aspect of the invention provides a method of producing a three-dimensionally contoured laminated article, with the following steps:
a) providing a transfer-printing medium having sublimatable ink or dye thereon;
b) providing a stack of material layers including a substrate and a cover layer disposed directly or indirectly on the substrate, wherein the cover layer has an exposed outer surface;
c) bringing the transfer-printing medium into contact with the outer surface of the cover layer;
d) heating and pressing together the transfer-printing medium and the stack of material layers between two heated press tools, thereby forming a laminated body of the stack of material layers and transfer-printing the sublimatable ink or dye from the transfer-printing medium onto the outer surface of the cover layer; and
e) after the step d), pressing and molding the laminated body at an elevated molding temperature so as to deform the laminated body to form thereof the three-dimensionally contoured laminated article, wherein the outer surface of the cover layer forms an outer surface of the article, and the ink or dye forms a surface decoration on the outer surface of the article.

A further aspect of the invention provides a method of producing a three-dimensionally contoured article, with the following steps:
a) providing a transfer medium having sublimatable ink or dye forming an inverse printing image thereon;
b) transfer-printing the sublimatable ink or dye from the transfer medium onto a flat planar outer surface of an intermediate product to form a preliminary image with the ink or dye on the outer surface; and
c) after the step b), pressing and molding the intermediate product and thereby deforming the intermediate product to form thereof the three-dimensionally contoured article, wherein the outer surface of the intermediate product forms an outer surface of the article, and due to the deforming of the intermediate product the preliminary image is distorted with a visibly apparent distortion to form thereof a final image of a surface decoration on the outer surface of the article.

The inverse printing image on the transfer medium in the step a) has an opposite distortion relative to a desired appearance of the final image such that the opposite distortion compensates the visibly apparent distortion so that the final image of the surface decoration has the desired appearance. The transfer medium (e.g. paper web) was previously printed with sublimation dyes to form thereon the inverse or reverse image of the desired surface decoration.

There are additional features disclosed herein as preferred elements of particular embodiments, for example as follows. The apparatus according to the present invention preferably includes a pre-heating station that may comprise a contact oven or a contact heater press, or a radiant heater or a convection heater, in which the substrate is pre-heated and preferably pre-compressed and compacted. The inventive apparatus preferably further includes a material transport arrangement that transports the substrate into the heating station and from there into the laminating station, transports the cover layer into the laminating station, and then transports the laminated body into the molding station. The inventive method is carried out in the manner summarized above, for example using the inventive apparatus.

BRIEF DESCRIPTION OF THE DRAWINGS

In order that the invention may be clearly understood, it will now be described in connection with example embodiments, with reference to the accompanying drawings, wherein:

FIG. 1 is a schematic cross section through a laminated body as an intermediate product in a method according to the invention, wherein the laminated body includes a transfer-printed cover layer laminated indirectly onto a structural substrate with an adhesive layer therebetween;

FIG. 2 is a schematic cross section through another laminated body according to the invention, including a transfer-printed cover layer laminated onto a substrate including a cushioning layer and a structural substrate, with an adhesive layer between the cushioning layer and the structural substrate;

FIG. 3 is a schematic side view of an embodiment of an apparatus according to the invention including a heating station, a laminating and transfer-printing station, and a molding press station in succession;

FIG. 4 is a schematic top view of a portion of the apparatus according to FIG. 3, particularly showing a top view of the material transport arrangement that transports the substrate, the cover layer and the resulting laminated body into and among the processing stations of the apparatus.

Figure 5:
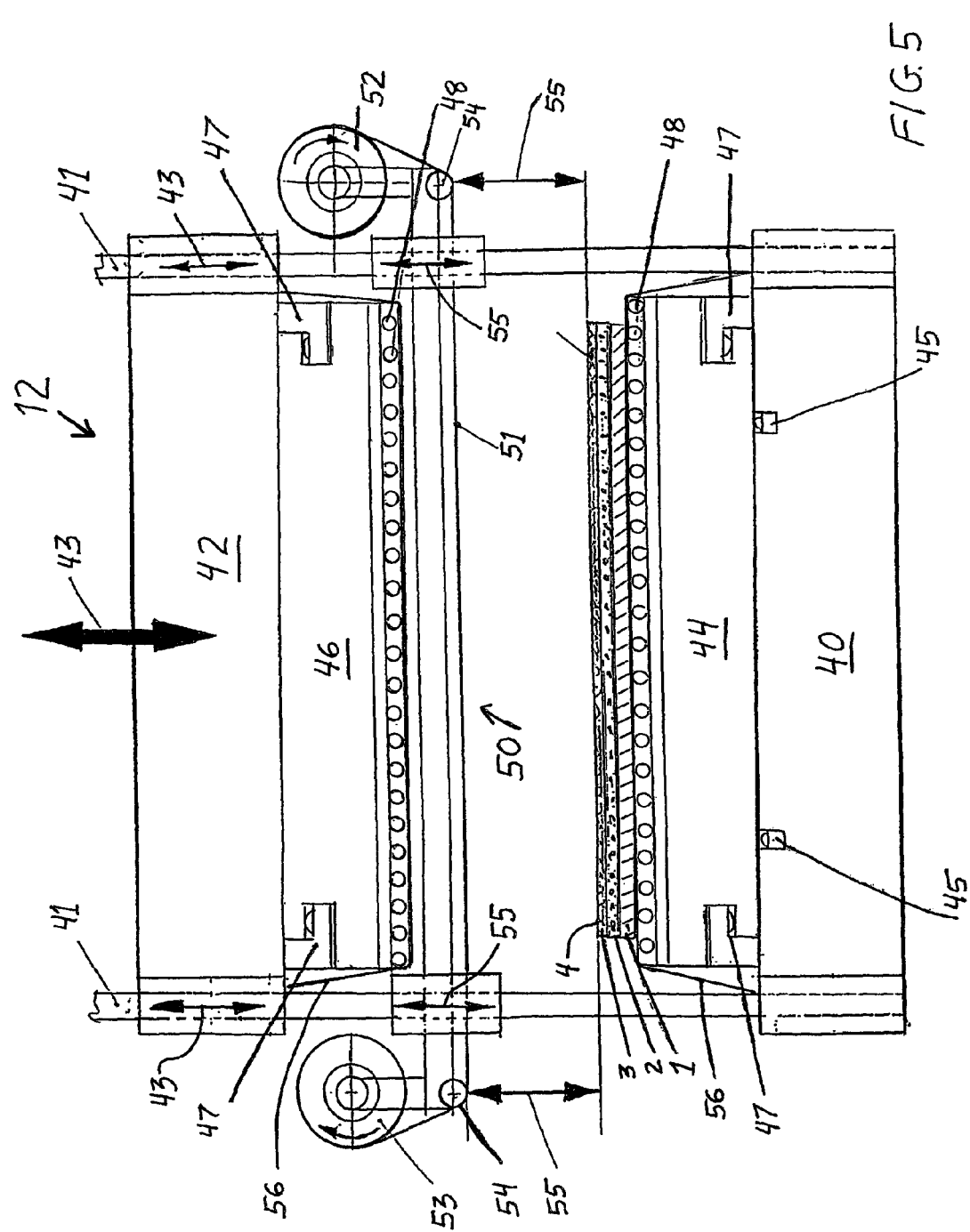
FIG. 5 is an enlarged schematic side view of a portion of the apparatus according to FIG. 3, showing the laminating and transfer-printing station.

DETAILED DESCRIPTION OF PREFERRED EXAMPLE EMBODIMENTS AND OF THE BEST MODE OF THE INVENTION

While the present inventive method and apparatus can be used for producing a variety of different types of laminated and three-dimensionally molded articles having a transfer-printed surface decoration, the invention is especially advantageous and will be described here in connection with the example of manufacturing interior trim components for motor vehicles (e.g. automobile headliners, aircraft cabin paneling, etc.). Such a trim component generally includes a decorative cover layer or decor layer 3 directly or indirectly laminated onto a structural substrate 1, as shown in FIG. 1. In this application, a first layer being "directly or indirectly" laminated or disposed on a second layer means that one or more other layers or materials may optionally be interposed between the first and second layers. For example, an adhesive layer 5 may be interposed between the decor layer 3 and the structural substrate 1 if necessary to provide or enhance the adhesion.

The cover or decor layer 3 may be any conventionally known or future developed suitable layer to provide a covered surface of the trim component, such as natural leather, synthetic leather, vinyl or other plastic films, or woven or non-woven fabrics. Preferably, the decor layer 3 comprises a polyester non-woven fabric layer. More generally, it must simply be ensured that the material of the decor layer 3 is suitable for accepting the sublimation inks or dyes that will be applied by transfer-printing thereon. For example, it is sometimes necessary that materials must be pre-treated to be able to properly take-up the sublimation inks or dyes.

The substrate 1 is a single-layer or multi-layer structural substrate with any suitable moldable and then form-stable material and structure, preferably made of natural fibers (e.g. kenaf fibers) and/or synthetic fibers (e.g. polyolefin fibers), for example an intermingled and inter-needled fleece mat of such fibers, optionally further combined with other matrix materials or fillers. The structural substrate is suitable to be molded from a flat shape to a three-dimensionally contoured configuration in a hot molding process, and once the structural substrate is cooled after being hot-molded it will maintain the molded configuration and support the decor layer in a form-stable manner. Preferably, the structural substrate 1 is a multi-layered substrate including synthetic plastic and natural fibers, as disclosed in U.S. Pat. No. 5,709,925 (Spengler et al.) or U.S. Pat. No. 6,287,678 (Spengler).

The adhesive layer 5 may comprise a layer or film of polyethylene introduced between the layers 1 and 3, or a powder of polyethylene or other suitable adhesive sintered onto the back of the decor layer 3, or a scrim, chenille, loose fleece or loose mesh of polyethylene or other suitable heat-bonding material introduced between the layers 1 and 3, or a hot melt adhesive applied onto or between the facing surfaces of the layers 1 or 3, for example. The adhesive layer is only needed if the other layers to be laminated do not themselves provide sufficient mutual hot-lamination adhesion to one another (for example because a polyester decor layer will not sufficiently bond to the substrate material), and then the adhesive layer material is selected to provide the necessary adhesion.

As shown in FIG. 2, the laminated body may further include an intermediate cushioning layer 2 interposed between the decor layer 3 and the structural substrate 1. The intermediate cushioning layer 2 may comprise an elastic yielding foam or fleece provided at limited areas or over the entire area between the decor layer 3 and the structural substrate 1 in order to provide a cushioned "soft-touch" effect at the limited enhanced cushioning areas or over the entire area of the component. The term "substrate" may refer to the structural substrate 1 by itself, or the combination of the structural substrate 1 and the cushioning layer 2 together. The cushioning layer 2 may comprise polyurethane and/or polyethylene foam, and may be provided pre-laminated onto the back of the decor layer 3 (by flame laminating) as a pre-fabricated laminated material. Alternatively, the cushioning layer 2 may initially be separate from the decor layer 3. In any event, an adhesive layer 5, as described above, may be introduced if needed between the cushioning layer 2 and the substrate 1 to adhere these layers together.

FIGS. 1 and 2 further indicate that the outer surface 4 of the decor layer 3 has been provided with a transfer-printed surface decoration 4', which may be essentially any desired design, pattern, image, colors, text, artificial grain appearance, or the like. The surface decoration 4' has been applied onto the decor layer 3 by transfer-printing according to the invention as described herein.

FIGS. 1 and 2 can be regarded as schematically illustrating a laminated body as an intermediate product during the inventive manufacturing method, particularly a laminated body that includes the decor layer 3 laminated onto the structural substrate 1, optionally with the intermediate cushioning layer 2 and the adhesive layer 5 provided therebetween, and that further has the transfer-printed surface decoration 4' on the outer surface 4 of the decor layer 3. These layers have been heated, compressed/compacted and laminated, and the outer surface has been transfer-printed, as will be described in detail below. However, the laminated body of FIG. 1 or FIG. 2 preferably still has a flat planar shape, which will then be molded in a molding press to produce the three-dimensionally contoured configuration of the finished trim component for a motor vehicle interior. FIGS. 1 and 2 can alternatively be regarded as schematic illustrations of a small section of the finished molded trim component at a flat planar area thereof, therefore not showing the three-dimensionally contoured configuration.

FIGS. 3 and 4 show an overview of an example embodiment of an apparatus for producing a laminated and three-dimensionally molded article with a transfer-printed surface decoration according to the invention. FIG. 3 shows a side view of the major stations of the apparatus, and FIG. 4 shows a top view of a material transport arrangement cooperating with the three major stations of the apparatus. Note that the top view of FIG. 4 and the side view of FIG. 3 are laterally aligned with each other.

As shown in FIG. 3, the apparatus 10 includes a heating station 11, a laminating and transfer-printing station 12, and a molding station 13. FIG. 4 shows the material transport arrangement 14 of the apparatus 10 cooperating with the above mentioned stations. The stations are arranged "adjacent" to one another, i.e. sufficiently proximate in space so that the materials being processed can be transported from one station to the next while still remaining sufficiently hot to carry out the next step of the method. Similarly, the steps of the method are carried out "directly" following one another, i.e. sufficiently proximate in time so that the materials being processed remain sufficiently hot to carry out the next step of the method.

The heating station 11 shown at the right of FIG. 3 can alternatively comprise radiant heaters or convection heaters, but in the illustrated embodiment preferably comprises a contact heater press for pre-heating and pre-compressing the structural substrate 1 (optionally together with the decor layer 3 if there is no cushioning layer 2). At this stage in the illustrated embodiment, the cover layer or decor layer 3 has preferably not yet been arranged on the substrate 1 to be laminated therewith, because the decor layer 3 is preferably separately introduced at room temperature (i.e. not purposely heated, e.g. at a temperature of 15° C. to 45° C.) into the laminating and transfer-printing station 12 as will be explained below. But in alternative embodiments the decor layer 3 can already be arranged on and laminated with the substrate 1 in the heating station 11, especially if there is to be no cushioning layer 2, while care is taken not to heat the decor layer to a temperature at which it is damaged. The cushioning layer 2 is preferably not introduced into the heating station 11, but rather only into the laminating station 12, to avoid damaging or crushing the cushioning layer by the heat and pressure of the heating station.

The heating station 11 includes a heating station base or stationary lower table 20 that supports vertically extending slide columns or guide shafts 21. The heating station 11 further includes a heating station upper table 22 that is vertically movable along the slide columns 21 as shown by the vertical up-down motion arrow 23. This vertical motion can be driven by any suitable mechanisms, such as hydraulic or pneumatic cylinders, or any type of motor drive. The stationary base or lower table 20 and the movable upper table 22 respectively carry a lower contact heater tool 24 and an upper contact heater tool 26. These contact heater tools 24 and 26 perform the actual heating and pressing of the substrate placed between them. For this purpose, the contact heater tools 24 and 26 are equipped with heating channels 28 embedded near and along the contact platen surfaces of the heater tools 24 and 26. These heating channels 28 may simply be fluid flow passages for flowing-through a heated liquid, or preferably receive heating rods or heating coils therein, such as an electrical resistance heating rod or coil, which may further be oil-filled.

For the ability to manufacture different plan format sizes or dimensions of trim components, the heater tools 24 and 26 are removable and exchangeable so that different heater tools having different plan formats or sizes can selectively be mounted on the press tables 20 and 22 of the heating station 11 as needed for different trim component formats or sizes. While a too-large heater tool could be used for a smaller trim component, it would require wasteful unnecessary heating, so that it is advantageous to match the format of the heater tools to the format of the trim components being produced. For this purpose, the exchangeable heater tools 24 and 26 are releasably secured by securing clamps 27 to the lower table 20 and upper table 22. To facilitate the exchange of the heater tools, the lower heater tool 24 is supported on hydraulic roller ball supports 25. To carry out an exchange, the contact heater press of the heating station 11 is closed (without any substrate therein), so that the upper contact heater tool 26 rests and is supported on the lower contact heater tool 24. Then the securing clamps 27 are released, and the upper table 22 is raised to leave the upper heater tool 26 resting on the lower heater tool 24. Then the hydraulic roller ball supports 25 are hydraulicly raised slightly above the support surface of the lower table 20, so that the heater unit or package of the upper heater tool 26 and the lower heater tool 24 is supported on the roller ball supports 25. The heater tools 24 and 26 are then easily pushed laterally out of the heating station 11 and replaced by a different set of heater tools with a different plan format or size. An apparatus according to the invention can be provided with a "kit" of several different sizes and formats of heater tools, to be exchanged as needed for different articles being produced.

FIG. 3 further shows a lift arrangement 29, for example comprising hydraulic or pneumatic cylinders, carrying material transport rails 30. Transport grippers 31, which may be gripper bars, gripper rails, claws, tenter hooks or the like are motor driven along the transport rails 30, and selectively grip or engage the edges of the material being processed to move it from station to station. In order to enable the exchange of the heater tools 24 and 26 by sliding or rolling the heater tools laterally out of heating station 11 as described above, the material transport rails 30 can be moved laterally out of the way to both sides by suitable drives in the motion directions 32 as shown in FIG. 4, and upwardly out of the way by the lift arrangement 29 in the motion direction 37 as shown in FIG. 3. Thereby the material transport rails 30 are clear of the area so that the heater tools 24 and 26 can be exchanged without any hindrance as discussed above. The lateral movability of the transport rails 30 in the lateral directions 32 also allows a width adjustment of the transport rails 30 to accommodate different formats or sizes of the materials being processed. Also, the vertical motion 37 driven by the lift arrangement 29 enables the transport rails 30 to move the transport grippers 31 up and down so as to pick-up and deposit the materials being processed in each respective station.

As further shown in FIG. 4 the structural substrate 1 (and optionally the decor layer 3) is first placed on a substrate loading and transport table 33, which is driven to shuttle the substrate and cushioning layer laterally in the motion direction 34 into the heating station 11, where the substrate 1 is placed onto the lower contact heater tool 24. In the heating station 11, the substrate 1 can be gripped and picked-up by the transport grippers 31 carried by the material transport rails 30 for being transported to and among the stations of the apparatus.

In the heating station 11, the upper table 22 is moved downwardly along 23 to close the heater press or contact oven onto the substrate 1 received between the heater tools 24 and 26. A sufficient temperature and pressure are applied by the heater tools 24 and 26 to the substrate 1, so that the substrate is pre-heated, densified and compacted or conglomerated, as well as being internally bonded together. For example, a pressure of about 6 kg/cm$^2$, or in the range of 3 to 6 kg/cm$^2$ is applied by the movable upper pressing table 22, and a temperature of preferably about 210° C. is applied by the heating channels 28 of the lower and upper heater tools 24 and 26. The closed spacing distance between the press surfaces of the heater tools is set and maintained (e.g. in a typical range of 2 to 5 mm) depending on the intended thickness and density of the substrate 1. For example, for a final substrate thickness of 2 mm, the closed heater spacing distance is set to 2 mm, and for a final substrate thickness of 4 mm, the closed heater spacing distance is set to 4 mm. Also, different areas of the substrate could be pre-pressed to different thicknesses, or have a partial contour pre-pressed therein, by providing appropriately contoured press surfaces of the heater tools. After the pre-heating and the pre-pressing, then the heater press is opened, and the pre-heated and pre-compacted substrate 1 is transported by the grippers 31 along the rails 30 in the feed direction 35 into the laminating and transfer-printing station 12.

As shown in FIG. 3 and in an enlarged view in FIG. 5, the laminating and transfer-printing station 12 has a basic construction similar to the pressing apparatus of the heating station 11. Particularly, the laminating and transfer-printing station 12 includes a base or stationary lower table 40, slide columns or guide shafts 41 extending upright from the lower table 40, and a movable upper table 42 that is slidably or movably carried along the slide columns 41. Thereby the upper table 42 can move vertically up and down in the motion direction 43 along the slide columns 41, while being driven in any suitable manner, for example by a pneumatic or hydraulic cylinder arrangement. A lower laminating heater tool 44 is arranged and releasably secured by securing clamps 47 on the lower table 40. An upper laminating and transfer-printing heater tool 46 is releasably carried and secured by securing clamps 47 on the upper table 42. To provide the heat necessary for the laminating and transfer-printing process, the heater tools 44 and 46 are equipped with heating channels 48 similar to the heating channels 28 of the heating tools 24 and 26 of the heating station 11.

The heater tools 44 and 46 are removable and exchangeable with tools having a different size and/or format, in a manner similar to the heater tools 24 and 26 of the heating station 11. To exchange the heater tools 44 and 46 with heater tools of a different plan format or size, the upper table 42 moves downward to rest the upper heater tool 46 on the lower heater tool 44, then the hydraulic roller ball supports 45 are hydraulically raised to slightly lift and support the heater tool 44 on the rollers, and then the two heater tools 44 and 46 can easily be pushed laterally out of the laminating and transfer-printing station 12.

According to a key feature of the present invention, the laminating and transfer-printing station 12 further incorporates a carrier arrangement 50 for supplying and carrying a transfer-printing transfer medium 51 (e.g. transfer paper).

The carrier arrangement 50 is vertically movable in the up-down direction 55 along the slide columns 41 between the upper heater tool 46 and the lower heater tool 44. The carrier arrangement 50 supplies and carries a web of the transfer paper 51 that has previously been printed with sublimation dyes or inks (in any conventionally known manner) with a reverse or inverse image of the desired surface decoration 4' to be transfer-printed onto the outer surface 4 of the decor layer 3 of the motor vehicle trim component being produced. The inked transfer paper 51 is fed from a transfer paper supply 52 such as a supply roll 52, over transfer paper deflecting rollers 54 along a flat planar feed and printing path to a "used" or "spent" transfer paper take-up, e.g. a take-up roll 53. Replaceable protective cover sheets 56 are preferably arranged to cover the press platen surfaces of the lower heater tool 44 and the upper heater tool 46 of the laminating and transfer-printing station 12.

To carry out the lamination and transfer-printing, the pre-heated and pre-compressed substrate 1 is transported from the heating station 11 into the laminating and transfer-printing station 12 as described above, and is deposited on the protective cover sheet 56 on the lower heater tool 44. Then, as seen in FIG. 4, a decorative cover layer or decor layer 3, without surface decoration 4', as well as a cushioning layer 2 (if desired in the article being produced), are shuttled by a decor loading table 38 of the material transport arrangement 14 in a lateral feed or transport direction 39 into the laminating and transfer-printing station 12, to be deposited there on top of the substrate 1. The decor layer 3 and cushioning layer 2 may be separate layers, or may be provided pre-laminated to one another. An adhesive layer 5 may be provided between the substrate 1 and the decor layer 3 or cushioning layer 2 if present.

While the decor layer 3 (and optionally layers 2 and 5) is introduced at room temperature, the substrate 1 is still hot (preferably essentially still at about 210° C.) from the pre-heating step in the heating station 11. Heat energy from the hot substrate contributes to heating of the layers 2, 3 and 5. The heated temperature of the substrate is maintained or supplemented by heating at preferably about 210° C. with the heating channels 48 in the lower heater tool 44 of the laminating and transfer-printing station 12. The heating channels 48 of the upper heating tool 46 are also heated to preferably about 210° C. so as to appropriately heat the layers 2, 3 and 5. The temperature selected is suitable both for the lamination as well as the transfer printing, depending on the materials of the layers 1, 2 and 3, and the sublimation ink or dye being used. While the preferred temperatures are stated above, more generally the heating temperature of all the heater tools 24, 26, 44 and 46 may be individually respectively adjusted to temperatures in the range from about 195° C. to about 225° C., depending on the different materials of the layers 1, 2 and 3, and depending on the characteristics of the sublimation dye or ink of the transfer paper 51, so as to effectively achieve the hot-melt consolidation, adhesion bonding, lamination and transfer-printing as described above.

The pressure applied in the laminating and transfer-printing station 12 is generally less than the pressure that was applied in the heating station 11, and the closed spacing distance between the press surfaces in the station 12 is also larger than that in the station 11, to allow for the added layers 2, 3 and 5, and to prevent crushing or damaging the layers 2 and 3. For example, the pressure applied in the laminating and transfer-printing station 12 is in the range of 1 to 6 kg/cm$^2$ of surface area of the laminated body being produced. As an example of the spacing distance of the closed press surfaces, the spacing distance is set to 5.5 mm if the substrate thickness is 2 mm and the cushioning layer thickness is 4 mm, while the spacing distance is set to 7.5 mm if the substrate thickness is 4 mm and the cushioning layer thickness is 4 mm. The applied pressure is sufficient for carrying out the hot-lamination and transfer-printing, especially because the substrate has already been pre-compressed/compacted in the heating press station 11. The temperature and pressure in this station 12 are low enough to avoid damaging the decor layer 3 material and the cushioning layer 2.

The transfer paper 51 is advanced to move a new inverse or reverse (i.e. mirror-opposite) ink or dye image of the surface decoration (e.g. pattern or design) into proper registration alignment over the decor layer 3. The ink or dye printed on the transfer paper 51 can form successive reverse copies of the surface decoration, which can be simply a continuous print of a repeating pattern or can be distinct successive images. Registration sensors, e.g. an optical sensor that senses the printed pattern or mechanical feelers that sense registration holes in the transfer paper 51, ensure an exact registration alignment of the printed image with the exact required print position on the surface 4 of the decor layer 3 of the trim component being produced.

The transfer medium carrier arrangement 50 moves downwardly along the slide columns 41 to bring the inked transfer paper 51 into smooth, registered, planar surfacial contact with the outer surface 4 of the decor layer 3. Then the planar hot press platen surface of the upper heater tool 46 is driven downward by the upper table 42 along the slide columns 41. The heat and pressure applied by the upper heater tool 46 to the transfer paper 51 causes the ink or dye on the paper to sublimate from the solid state into the gaseous state, transfer onto the outer surface 4 of the decor layer 3, and diffuse into the fibers of the decor layer 3. Simultaneously, the heat and pressure applied by both tools 44 and 46 to the substrate 1, cushioning layer 2 and decor layer 3 therebetween serve to laminate and hot-melt bond the decor layer 3 onto the cushioning layer 2, and the cushioning layer 2 onto the substrate 1, or the decor layer 3 onto the substrate 1 if there is no cushioning layer. Depending on the materials of the layers, it may be necessary or beneficial to introduce an additional adhesive bonding layer 5 between the decor layer 3 or cushioning layer 2 and the substrate 1, but preferably such an adhesive bonding layer is not necessary, because compatible materials that will hot-melt bond together are selected for the layers 1, 2 and 3.

During the lamination and transfer-printing process, the protective cover sheets 56 protect the press platen surfaces of the lower heater tool 44 and the upper heater tool 46 against any possible adhesion of the substrate 1 or the transfer paper 51, or any possible soiling by ink or dye from the transfer paper 51. For this purpose, each protective cover sheet 56 may be a heat-resistant woven textile web sheet such as a woven cotton sheet, or a polytetrafluoroethylene (PTFE) film. In this context, "heat resistant" means able to withstand the temperatures of the lamination and transfer-printing process without breakdown or failure. A woven textile sheet has been found to be desirable, because it further provides a slight degree of cushioning, distribution of the lamination pressing forces, and compensation of any irregularities or non-uniformities, to ensure that an even lamination pressure is applied through the cover sheets 56 onto the layers therebetween. Also, a woven protective cover sheet 56 is also preferred, because the woven structure thereof allows a slight air buffer and air escape from the transfer paper 51, which has been found to enhance the sublimation of the dyes or inks from the paper 51 onto the surface 4 of the decor layer 3.

By the transfer-printing process, a surface decoration 4' (such as a design, pattern, image, colors, text, artificial graining appearance or the like) has been printed onto the outer surface 4 of the decor layer 3 by sublimation transfer from the transfer paper 51. The laminating press is then opened by moving the upper table 42 with the upper heater tool 46 upwardly, and also moving the transfer paper carrier arrangement 50 upwardly away from the laminated body that has been formed by the decor layer 3 heat-laminated onto the cushioning layer 2 and the structural substrate 1. The spent or used transfer paper 51 is then advanced, whereby the now-inkless area of the transfer paper 51 is rolled up onto the take-up roll 53 while a new inked area of the paper 51 is unrolled from the supply roll 52 into proper registration position for the next transfer-printing process for producing the next printed laminated body.

After the lamination and transfer-printing process, the laminated body including the layers 1, 2 and 3 is picked-up by the transport gripper 31 and fed in the forward feed or transport direction 36 along the transport rails 30 into the molding station 13. To achieve this, telescopic extensions 30A of the rails 30 extend into the open molding station 13 to deposit the laminated body therein.

For carrying out the final three-dimensional deformation molding of the initially flat planar laminated body (or slightly pre-contoured laminated body arising if the heating station 11 already slightly pre-contoured the substrate), the molding station 13 includes a stationary press machine base or lower table 60, slide columns or guide shafts 61 extending upward from the lower table 60, a press machine upper frame 62 holding the upper ends of the slide columns 61, and a press machine upper table or press platen 63 that is movable vertically in the direction 65 along the slide columns 61. The vertical motion of the press platen 63 can be driven by any suitable means, for example hydraulic or pneumatic cylinders or any type of motor drive. Note that FIG. 3 does not show upper frame members of the heating station 11 and the laminating and transfer-printing station 12, but instead merely shows a broken-off lower portion of those two stations. It should be understood, nonetheless, that the upper end of each station 11 and 12 may additionally comprise an upper frame similar to the upper frame 62 of the molding station 13.

The molding station 13 further comprises a lower mold tool 66 supported on the lower table 60, and an upper mold tool 67 carried by the upper table or press platen 63. The mold tools 66 and 67 are releasably secured on the platens or tables of the molding station, so that the mold tools can be exchanged when trim components having different formats, sizes or three-dimensional contoured configurations are to be produced.

After the heated laminated body is transported into the open mold cavity 69 between the two mold tools 66 and 67, by the transport grippers 31 along the transport rails 30 with telescopic extensions 30A, then the press platen 63 moves downward to close the upper mold tool 67 toward the lower mold tool 66. Thereby, the mold cavity 69 is closed with the laminated body therein. At this point or previously, the laminated body was released from the transport grippers 31. The still-hot laminated body including the structural substrate 1, the cushioning layer 2, and the decor layer 3 is soft and flexible and therefore is readily molded into a three-dimensionally deformed contour matching the contour shape of the mold tools 66 and 67. The mold tools 66 and 67 are cooled by a cooling fluid flowing through cooling channels 68, so as to remove heat from (i.e. cool down) the molded laminated body in the mold cavity 69. By cooling down the molded laminated body, to a temperature below a thermoplastic transition or setting temperature, the substrate 1 is no longer thermoplastically deformable, and instead is set to maintain the molded three-dimensional contoured configuration according to the shape of the mold tools. The molding station 13 is then opened, and the molded laminated body with layers 1, 2 and 3 is removed from the mold as a form-stable, laminated and three-dimensionally molded article with a surface decoration 4' transfer-printed onto the outer surface 4 of the decor layer 3.

During the three-dimensional deformation molding of the laminated body, certain areas of the laminated body, for example corners, curves, and deep-drawn transitions in surface contour, become stretched from the original (e.g. planar) configuration. Thus, due to the stretching of the decor layer 3 in such areas, the preliminary image of the surface decoration 4' as transfer-printed onto the outer surface 4 of the decor layer 3 similarly becomes stretched and deformed into a final image of the surface decoration 4' on the finished molded article. The final image potentially has a visibly apparent distortion relative to the preliminary image as it was transfer-printed, i.e. human visual comparison of the two images will be able to detect a variation or distortion from the preliminary image to the final image. To compensate for such distortion caused by stretching deformation of the printed pattern during the molding, it is advantageous to correspondingly oppositely adjust the inverse or reverse printed pattern that is originally provided on the transfer paper 51. To achieve this, the areas, directions, and magnitudes of the stretching deformation during the molding process must be determined by calculation, experience, or experimental trials, and then the image or decorative pattern in corresponding areas on the transfer paper is correspondingly adjusted in an opposite manner to compensate for the later stretching deformation. Such compensation can easily be achieved by digitally manipulating (with commercially available image processing software) the image data that are used for printing the sublimation inks or dyes onto the transfer paper 51 for subsequent transfer-printing onto the decor layer 3. With such previous opposite distortion of the transfer-printed pattern for the purpose of compensation, the final resulting image of the surface decoration 4' on the finished three-dimensionally contoured molded article gives a correct, undistorted representation of the intended or desired final appearance of the surface decoration.

The preferred method according to the invention has been described above in connection with the operation of the apparatus. In the preferred embodiment, the decor layer 3 and the optional cushioning layer 2 are introduced in a "cold" (room temperature) state in the laminating and transfer-printing station 12, onto the pre-heated and pre-consolidated substrate 1 that has been transported from the heating station 11. Alternatively, however, the decor layer 3 can be introduced together with the substrate 1 into the heating station 11 (if there will be no cushioning layer), whereby the decor layer 3 is pre-heated and pre-laminated with the substrate 1 as the substrate 1 is also consolidated, before being introduced as a laminated body into the laminating and transfer-printing station 12. In such a case, the cover layer can have been hot-melt laminated or inter-needled onto the substrate in a prior operation. Such an embodiment of introducing the decor layer into the pre-heating station is usually less desirable, because it allows less flexibility in the control of the temperatures and pressures, and can result in over-heating or over-pressing of the decor layer giving rise to damage thereof. Namely, depending on the material of the decor layer 3, the structure or texture of the decor layer 3 (such as a woven material texture) would be excessively crushed and "ironed flat" by the high compaction pressure applied in the heating station 11. Therefore it is generally preferred to separately introduce the cold decor layer 3 into the laminating and transfer-printing station 12.

Because the cushioning layer 2 generally cannot be pressed and heated at the pressures and temperatures necessary for consolidating the substrate 1 (to avoid crushing/destroying the foam), the pre-heating station is generally necessary as a separate station for producing any laminated article that is to include a cushioning layer. As a third alternative, however, especially for producing articles without a cushioning layer, the heating station 11 and the laminating and transfer-printing station 12 can effectively be combined into a single station with a single press apparatus. For example, that means that the heating station 11 is omitted, and the station 12 carries out the pre-heating function, the consolidation function, the laminating function, the adhesive-bonding function, and the transfer-printing function all in a single station. This, however, can cause difficulties in the control of temperature and pressure and is not suitable for some materials (e.g. foam cushioning materials). Also, the cycle time of the apparatus would be much longer, because all of the heating necessary to heat all of the layers from room temperature up to the compaction, adhesive bonding, lamination and transfer-printing temperature must be achieved in one cycle in the single station. Therefore it is advantageous to provide the pre-heating station 11 to carry out the pre-heating and pre-compaction of the substrate 1 as described above.

It is advantageous to select materials for which the necessary thermoplastic deformation, compaction, adhesive bonding and lamination temperature essentially corresponds to the required transfer-printing temperature. This correspondence of temperatures is best achieved preferably at about 210° C., or in a range from about 205° C. to about 215° C., or more generally from about 200° C. to about 225° C.

Throughout this text, the term "about" can be considered to cover a range of ±2.5° C. unless otherwise specified or understood.

The inventive method and apparatus achieve a versatile, flexible and adaptable printing of essentially any desired surface decoration onto an outer surface of a decor layer of a three-dimensionally contoured molded laminated article, such as a vehicle interior trim component. The number of different colors, patterns, images etc. that can be offered for the trim components is thereby increased, and the decorated trim components can be produced more economically nonetheless. The production line can be easily and rapidly changed to different formats or sizes of components to be produced, by exchanging the heater tools and the mold tools as discussed above. The surface decoration can easily and quickly be changed to a different pattern, design, image color, text, etc. by simply changing the supply roll of transfer paper 51. The transfer paper is provided with the required patterns or images printed thereon, by any suitable printing process in a previous operation. For example, the transfer paper can be provided by a separate vendor, to be used in the method and apparatus according to the invention. Various different materials of the layers 1, 2 and 3 can also be processed according to the invention, whereby such materials are previously prepared and may also be separately provided by suitable vendors for use in the inventive method and apparatus.

Further versatility is provided in that the inventive apparatus can also be used to produce conventional molded components without a transfer-printed surface decoration, simply by omitting the transfer paper 51 or moving aside the transfer paper carrier arrangement 50. Thereby it is easy to switch the production line between the fabrication of non-patterned trim components and patterned trim components, for example.

Also, the inventive features can be retrofitted onto existing apparatuses or production lines for producing laminated and three-dimensionally molded components. For example, the transfer paper carrier arrangement 50 can be retrofitted onto an existing laminating station to additionally carry out the transfer-printing function.

Combining the transfer-printing equipment and process into the lamination station and step according to the invention achieves significant savings of capital investment (no need to purchase a separate transfer printing station), energy (no need to heat the laminated body once for transfer printing and then again separately for lamination), time (no need for successive separate operations of transfer printing and lamination), and operating personnel manpower (no need for separate workers to operate separate transfer printing and lamination stations).

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for producing a three-dimensionally contoured laminated article, comprising:
    a laminating and transfer-printing station comprising a first laminating tool and a second laminating tool wherein at least one of said laminating tools is drivable toward and away from the other of said laminating tools, a laminating heater arrangement that is arranged and adapted to heat said first and second laminating tools, and a transfer-printing transfer medium carrier arrangement that is movably arranged between said first and second laminating tools and that is drivable toward and away from at least one of said laminating tools, wherein said carrier arrangement is arranged and adapted to supply and feed a transfer medium for transfer-printing between said first and second laminating tools, and wherein said first and second laminating tools respectively have first and second laminating press surfaces arranged and adapted to receive, heat and press therebetween the transfer medium and a laminated body as an intermediate product for production of the three-dimensionally contoured laminated article whereby a surface decoration is transfer-printed from the transfer medium onto a surface of the laminated body; and
    a molding station comprising a first mold tool and a second mold tool that is drivable toward and away from said first mold tool, wherein said first and second mold tools respectively have first and second three-dimensionally contoured mold surfaces arranged and adapted to receive and three-dimensionally mold therebetween the laminated body to produce the three-dimensionally contoured laminated article having the surface decoration on an outer surface thereof.

2. The apparatus according to claim 1, wherein said transfer-printing transfer medium carrier arrangement comprises a supply roll of a web of said transfer medium having sublimatable ink or dye thereon forming successive inverse copies of said surface decoration along said web, a take-up roll of said transfer medium, and deflection rollers deflecting and guiding said web of said transfer medium from said supply roll to said take-up roll so that said web extends parallel to and between said first and second laminating press surfaces.

3. The apparatus according to claim 1, wherein said first and second laminating press surfaces are flat planar surfaces.

4. The apparatus according to claim 1, further comprising two protective cover sheets respectively covering said first and second laminating press surfaces.

5. The apparatus according to claim 4, wherein said protective cover sheets are heat-resistant woven fabric sheets.

6. The apparatus according to claim 4, wherein said protective cover sheets are heat-resistant polytetrafluoroethylene (PTFE) sheets.

7. The apparatus according to claim 1, wherein said laminating and transfer-printing station further comprises a first laminating press table with first securing clamps that removably mount said first laminating tool on said first laminating press table, and a second laminating press table with second securing clamps that removably mount said second laminating tool on said second laminating press table.

8. The apparatus according to claim 7, wherein said laminating and transfer-printing station further comprises hydraulic roller ball supports that are arranged in said first laminating press table and that are selectively hydraulicly actuatable to lift up and support said first laminating tool on said roller ball supports above a table surface of said first laminating press table.

9. The apparatus according to claim 7, further in combination with third and fourth laminating press tools that have a different format than, and can selectively exchangeably replace, said first and second laminating press tools on said first and second laminating press tables.

10. The apparatus according to claim 1, further comprising a material transport arrangement that comprises transport rails which extend along said laminating and transfer-printing station and to said molding station, gripper elements that are drivenly movable along said transport rails and adapted to grip edges of the laminated body to transport the laminated body from said laminating and transfer-printing station to said molding station, and a material loading and transport table arranged adjacent to said laminating and transfer-printing station and adapted to shuttle at least one material layer into said laminating and transfer-printing station to form at least a part of the laminated body.

11. The apparatus according to claim 10, further comprising a drive arrangement connected to said transport rails and adapted to move said transport rails in an up-down direction and in a lateral in-out direction relative to said first laminating tool of said laminating and transfer-printing station.

12. The apparatus according to claim 10, wherein said material transport arrangement further comprises telescopic extension rails that are telescopically extendible from ends of said transport rails into said molding station.

13. The apparatus according to claim 1, wherein said laminating heater arrangement comprises first and second heaters respectively incorporated into said first and second laminating tools.

14. The apparatus according to claim 13, wherein said heaters are electrically-heated, oil-filled heater rods or tubes.

15. The apparatus according to claim 1, further comprising a heating station arranged adjacent to said laminating and transfer-printing station, wherein said heating station comprises a first heating tool and a second heating tool wherein at least one of said heating tools is drivable toward and away from the other of said heating tools.

16. The apparatus according to claim 15, wherein said first and second heating tools comprise heatable contact heater plates having a heater arrangement respectively disposed therein and having contact heater press surfaces arranged and adapted to receive, heat and press therebetween at least a structural substrate to be included in the laminated body for production of the three-dimensionally contoured laminated article.

17. The apparatus according to claim 16, wherein said heater arrangement respectively disposed in each of said contact heater plates comprises electrically-heated, oil-filled heater rods or tubes.

18. The apparatus according to claim 16, wherein said heating station further comprises a first heating press table with first securing clamps that removably mount said first heating tool on said first heating press table, and a second heating press table with second securing clamps that removably mount said second heating tool on said second heating press table.

19. The apparatus according to claim 15, wherein said first heating tool and said second heating tool each respectively have a respective flat planar heating contact surface, and wherein said first and second laminating press surfaces are respective flat planar surfaces.

20. The apparatus according to claim 13, wherein said laminating heater arrangement further comprises a controller adapted to independently control a first heating temperature of said first heater and a second heating temperature of said second heater.

21. The apparatus according to claim 20, wherein said controller is adapted to control said first heating temperature of said first heater to be in a range from 195° C. to 210° C., and to control said second heating temperature of said second heater to be in a range from 210° C. to 225° C. and higher than said first heating temperature.

22. An apparatus for producing a three-dimensionally contoured laminated article, comprising:
- a pre-heating and pre-pressing station comprising a first heated press tool and a second heated press tool having respective contact heater press surfaces arranged and adapted to receive, heat and press therebetween at least a structural substrate, wherein at least one of said heated press tools is drivable toward and away from another of said heated press tools;
- a laminating and transfer-printing station arranged adjacent to said pre-heating and pre-pressing station, and comprising a first laminating tool and a second laminating tool wherein at least one of said laminating tools is drivable toward and away from another of said laminating tools, a laminating heater arrangement that is arranged and adapted to heat said first and second laminating tools, and a transfer-printing transfer medium carrier arrangement that is movably arranged between said first and second laminating tools and that is drivable toward and away from at least one of said laminating tools, wherein said carrier arrangement is arranged and adapted to supply and feed a transfer medium for transfer-printing between said first and second laminating tools, and wherein said first and second laminating tools respectively have first and second laminating press surfaces arranged and adapted to receive, heat and press therebetween the transfer medium and a laminated body including the structural substrate and a cover layer as an intermediate product for production of the three-dimensionally contoured laminated article whereby a surface decoration is transfer-printed from the transfer medium onto a surface of the cover layer of the laminated body; and
- a molding station comprising a first mold tool and a second mold tool that is drivable toward and away from said first mold tool, wherein said first and second mold tools respectively have first and second three-dimensionally contoured mold surfaces arranged and adapted to receive and three-dimensionally mold therebetween the laminated body to produce thereof the three-dimensionally contoured laminated article having the surface decoration on an outer surface of the cover layer thereof.

23. The apparatus according to claim 22, wherein said first and second laminating press surfaces are flat planar surfaces.

24. The apparatus according to claim 22, further comprising a temperature control arrangement adapted to control a pre-heating temperature of said first and second heated press tools of said pre-heating and pre-pressing station to be lower than a transfer-printing temperature of said laminating heater arrangement for at least one of said first and second laminating tools.

25. The apparatus according to claim 24, wherein said laminating heater arrangement comprises first and second heaters respectively in or on said first and second laminating tools, and wherein said temperature control arrangement is adapted to independently control said first heater to said transfer-printing temperature and to independently control said second heater to a second heating temperature lower than said transfer-printing temperature.

26. The apparatus according to claim 25, wherein said transfer-printing temperature is in a range from 210° C. to 225° C., and said second heating temperature is in a range from 195° C. to 210° C.

27. The apparatus according to claim 22, further comprising a pressure control arrangement adapted to control a pre-pressing pressure exerted by said heated press tools of said pre-heating and pre-pressing station to be higher than a laminating and transfer-printing pressure exerted by said first and second laminating tools of said laminating and transfer-printing station.

* * * * *